escape of vapors, and drying to a moisture content of substantially twelve percent (12%).

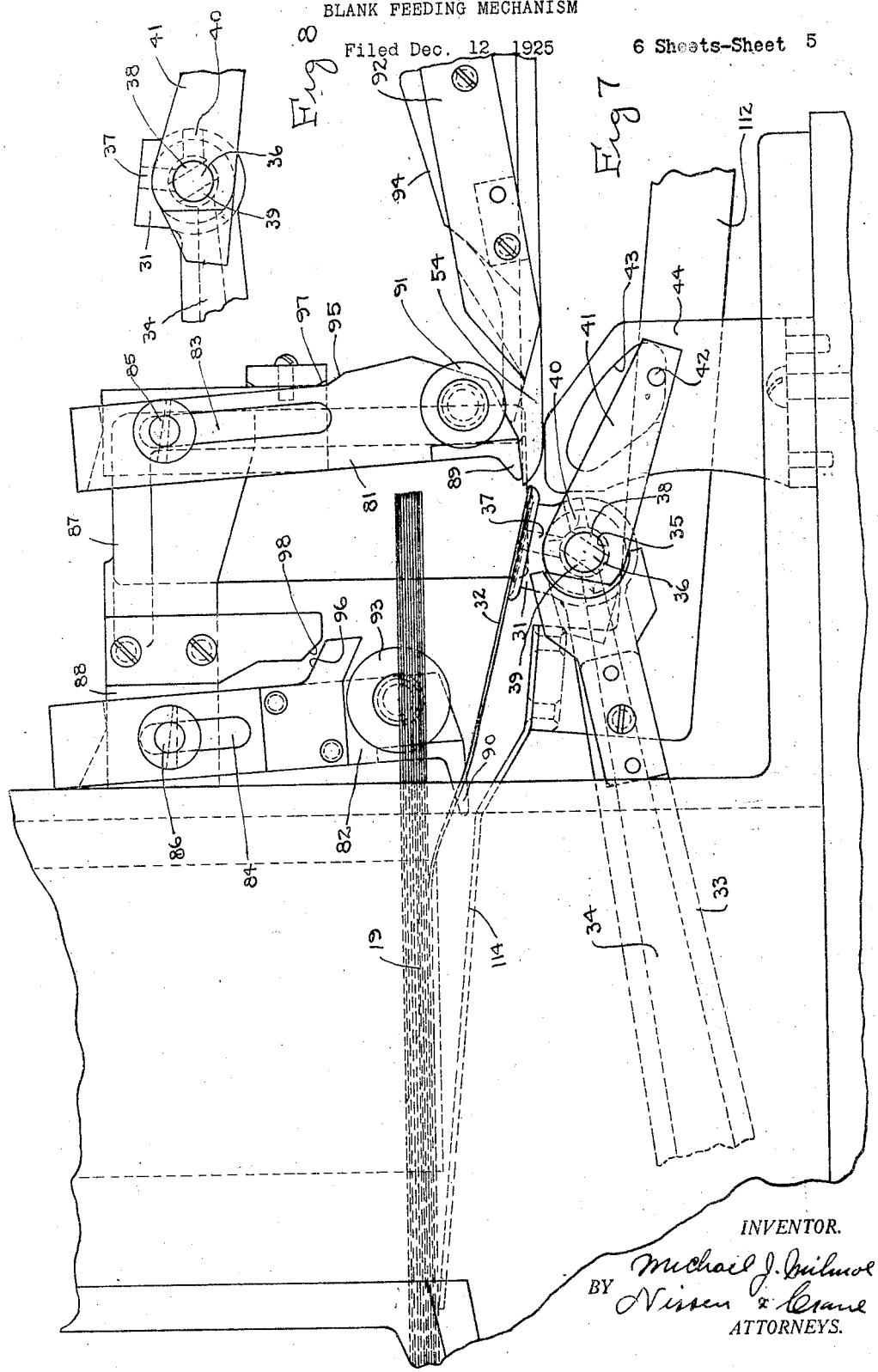

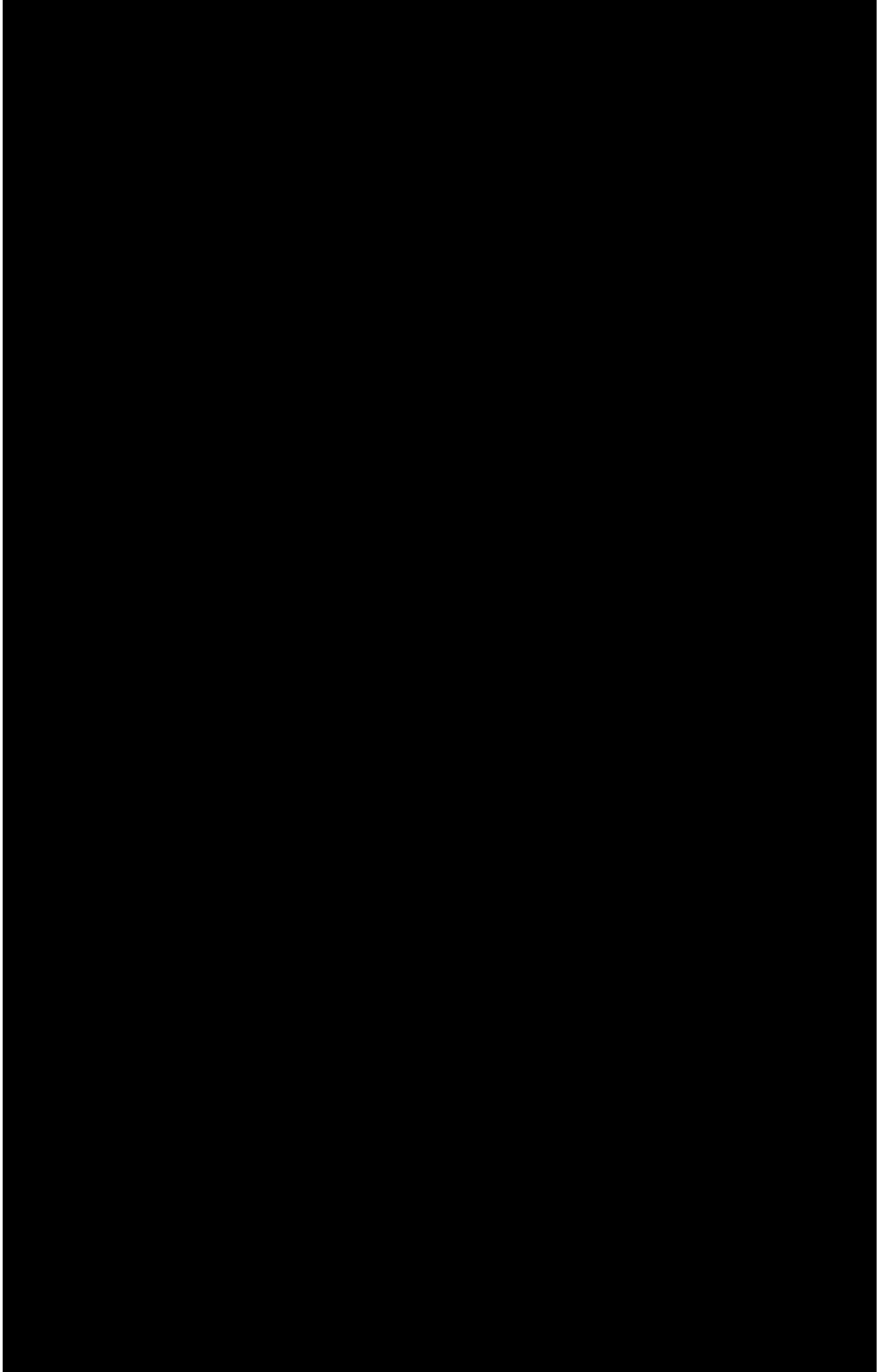

10. The process of treating oat hulls which consists in adding to them their own weight of water, eight percent (8%) of their weight of lime, thoroughly mixing these ingredients, subjecting this mixture to the action of a temperature of substantially 312° Fahr. and a pressure of substantially eighty pounds to the square inch for substantially three hours, cooling the mass without the escape of vapors, drying to a moisture content of substantially twelve percent (12%), and thereafter grinding said mass.

11. The process of treating oat hulls which consists in subjecting them to the conjoint action of heat, pressure and substantially less than its own weight of water in the presence of lime, said lime being present in both the solid and the dissolved state.

In witness whereof, we have hereunto subscribed our names.

CARL S. MINER.
GODFREY STEERUP.